(12) United States Patent
Shin (10) Patent No.: US 11,919,444 B2
(45) Date of Patent: Mar. 5, 2024

(54) GLOVE BOX LIGHTING DEVICE AND GLOVE BOX

(71) Applicant: NIFCO KOREA INC., Asan-si (KR)

(72) Inventor: Ho Sung Shin, Chungcheongnam-do (KR)

(73) Assignee: NIFCO KOREA INC., Asan-si (KR)

( * ) Notice: Subject to any disclaimer, the term of this patent is extended or adjusted under 35 U.S.C. 154(b) by 96 days.

(21) Appl. No.: 17/629,920

(22) PCT Filed: Jul. 30, 2020

(86) PCT No.: PCT/KR2020/010052
§ 371 (c)(1),
(2) Date: Jan. 25, 2022

(87) PCT Pub. No.: WO2021/020896
PCT Pub. Date: Feb. 4, 2021

(65) Prior Publication Data
US 2022/0250539 A1    Aug. 11, 2022

(30) Foreign Application Priority Data

Aug. 1, 2019 (KR) .......................... 10-2019-0093935

(51) Int. Cl.
*B60Q 3/88* (2017.01)
*B60Q 3/225* (2017.01)
(Continued)

(52) U.S. Cl.
CPC ............... *B60Q 3/88* (2017.02); *B60Q 3/225* (2017.02); *B60Q 3/82* (2017.02); *B60R 7/04* (2013.01); *B60R 16/005* (2013.01)

(58) Field of Classification Search
CPC .. B60Q 3/88; B60Q 3/225; B60Q 3/82; B60R 7/04; B60R 16/005; B60R 16/03; B60R 7/06; B60Y 2304/05; B60Y 2304/07
See application file for complete search history.

(56) References Cited

U.S. PATENT DOCUMENTS 4,979,083 A * 12/1990 Takano .................... B60Q 3/82
                                                          362/394
5,164,557 A * 11/1992 Allison ................ H01H 13/183
                                                          362/487
(Continued)

FOREIGN PATENT DOCUMENTS

JP        H06-156345 A    6/1994
KR    10-2008-0082766 A    9/2008
(Continued)

OTHER PUBLICATIONS

International Search Report for PCT/KR2020/010052 dated Nov. 24, 2020.
(Continued)

*Primary Examiner* — Tsion Tumebo
(74) *Attorney, Agent, or Firm* — Thomas| Horstemeyer, LLP (57) ABSTRACT

A glove box lighting device according to one embodiment of the present disclosure includes a switch unit (100) including a sliding rod (110) configured to linearly move in accordance with opening/closing of a glove box door (400); a lamp unit (200) including a lamp (220) configured to be turned on when power is supplied thereto and being configured to be fixed at one side of the glove box housing; and a wire (300) connecting the switch unit (100) and the lamp unit (200) to conduct electricity to each other. The glove box lighting device is configured such that the sliding rod (110) linearly moves and protrudes when the glove box door (400) is open, so as to supply power to the lamp (220).

8 Claims, 9 Drawing Sheets

(51) Int. Cl.
*B60Q 3/82* (2017.01)
*B60R 7/04* (2006.01)
*B60R 16/00* (2006.01)

(56) References Cited

U.S. PATENT DOCUMENTS

| | | | | |
|---|---|---|---|---|
| 5,264,670 | A * | 11/1993 | Leonard | H01H 13/183 |
| | | | | 200/61.81 |
| 5,557,081 | A * | 9/1996 | Clevenger | B60Q 3/82 |
| | | | | 200/548 |
| 2003/0081411 | A1 * | 5/2003 | Noda | B60Q 3/225 |
| | | | | 362/280 |
| 2005/0207158 | A1 * | 9/2005 | Nagai | B60Q 3/74 |
| | | | | 362/640 |
| 2005/0284740 | A1 * | 12/2005 | Nagai | B60Q 3/80 |
| | | | | 200/310 |
| 2006/0087836 | A1 * | 4/2006 | Morris | B60Q 3/225 |
| | | | | 362/489 |
| 2008/0302646 | A1 * | 12/2008 | Nagai | B60Q 3/82 |
| | | | | 200/339 |
| 2014/0056017 | A1 * | 2/2014 | Carloni | B60R 7/06 |
| | | | | 362/488 |
| 2016/0257247 | A1 * | 9/2016 | Munday | B60Q 3/233 |

FOREIGN PATENT DOCUMENTS

| | | |
|---|---|---|
| KR | 10-0972365 B1 | 7/2010 |
| KR | 10-0993796 B1 | 11/2010 |
| KR | 10-1328736 B1 | 11/2013 |
| KR | 101573686 B1 * | 12/2015 ............ B60Q 3/225 |
| KR | 10-2019-0065783 A | 6/2019 |

OTHER PUBLICATIONS

KR Office Action for KR Application No. 10-2019-0093935 dated Nov. 2, 2020.

* cited by examiner

GLOVE BOX LIGHTING DEVICE AND GLOVE BOX

CROSS-REFERENCE TO RELATED APPLICATIONS

This application is a 35 U.S.C. § 371 national stage application of, and claims priority to and benefit of, PCT Application No. PCT/KR2020/010052 filed on Jul. 30, 2020 entitled "LIGHTING DEVICE FOR GLOVE BOX, AND GLOVE BOX," which claims priority to and benefit of Korean Patent Application No. 10-2019-0093935 filed Aug. 1, 2019, and entitled "LIGHTING DEVICE OF GLOVE BOX," which are herein incorporated by reference in their entirety.

TECHNICAL FIELD

The present disclosure relates to a glove box lighting device, which is installed in a glove box of a vehicle, and a glove box.

BACKGROUND

Generally, a glove box installed in a vehicle is a configuration in which it is installed in a dashboard to store items.

Also, the glove box includes a glove box housing that forms a storage compartment in which items are placed.

A locking device and an opening/closing device may be installed in the glove box. The locking device can be used when locking the glove box using a key to prevent others from opening the glove box. The opening/closing device may be configured to be manipulated by a user to open the glove box in a state in which the locking device is unlocked.

Meanwhile, in recent years, many vehicles allow the inside of a glove box to be illuminated. In relation to this, Korean Patent Registration No. 10-0972365 discloses a "vehicle glove box." Specifically, the disclosed vehicle glove box includes a cover configured to selectively open/close a storage compartment, a housing configured to form a storage space along with the cover, a lighting lamp configured to illuminate the storage space, a switch configured to turn on/off the lighting lamp, and a locking lever which is rotatably installed at the cover and has one end portion configured to be engaged at the housing side. The lighting lamp is configured to be turned on/off in accordance with the operation of the locking lever.

SUMMARY

Various embodiments of the present disclosure provide a glove box lighting device having a simplified operation structure and allowing a lamp to be stably turned on or off in accordance with opening/closing of a glove box door.

A glove box lighting device according to one embodiment of the present disclosure may allow power to be supplied to or cut off from a lamp by a switch being turned on/off according to an open/closed state of a glove box door. In a state in which the lamp is turned on by power supplied thereto, the glove box lighting device may illuminate the inside of the glove box.

A glove box lighting device according to one embodiment of the present disclosure is installed in a glove box having a glove box housing and a glove box door 400. The glove box lighting device includes a switch unit 100 including a sliding rod 110 configured to linearly move in accordance with opening/closing of the glove box door 400; a lamp unit 200 including a lamp 220 configured to be turned on when power is supplied thereto and being configured to be fixed at one side of the glove box housing; and a wire 300 connecting the switch unit 100 and the lamp unit 200 to conduct electricity to each other. The glove box lighting device may be configured such that the sliding rod 110 linearly moves and protrudes when the glove box door 400 is open, so as to supply power to the lamp 220.

In one embodiment, the switch unit 100 may further include an elastic body 130 configured to apply an elastic force to allow the sliding rod 110 to protrude; a connector 120 configured to come in contact with a terminal 310 of the wire so that power is applied when the sliding rod 110 linearly moves and protrudes; and a cover 140 configured to fix the connector 120 and the sliding rod 110.

In one embodiment, the connector 120 may be fixed to the sliding rod 110.

In one embodiment, the lamp unit 200 may further include a terminal 240 connected to the wire 300.

In one embodiment, the switch unit 100 may be configured to be fixed to the glove box.

In one embodiment, the lamp unit 200 may further include a lamp housing 210 configured to be fixed to the glove box housing; a lens 230 which is fixed to a lower portion of the lamp housing 210 and through which light generated by the lamp 220 passes; and a terminal 240 configured to connect the lamp 220 and the wire 300 to allow power to be applied to the lamp 220.

In one embodiment, one side end portion of the terminal 240 may be connected to the lamp 220, and the other side end portion of the terminal 240 may be connected to the wire 300.

In one embodiment, the switch unit 100 may include a connector 120 fixed to the sliding rod 110; and an elastic body 130 configured to apply an elastic force to the sliding rod 110 in a contact direction A in which the sliding rod 110 comes in contact with the glove box door 400. The glove box lighting device may be configured such that, when the glove box door 400 is closed, the sliding rod 110 is pressed by the glove box door 400 to move in a direction B opposite to the contact direction so that the connector 120 is spaced apart from a terminal 310 of the wire 300. The glove box lighting device may be configured such that, when the glove box door 400 is open, the sliding rod 110 is released from being pressed by the glove box door 400, so that the sliding rod 110 moves in the contact direction A by the elastic force and the connector 120 comes in contact with the terminal 310 of the wire 300.

A glove box according to one embodiment of the present disclosure includes a glove box housing; a glove box door 400 configured to open/close the glove box housing; a switch unit 100 including a sliding rod 110 configured to linearly move in accordance with opening/closing of the glove box door 400; a lamp unit 200 including a lamp 220 configured to be turned on when power is supplied thereto and being configured to be fixed at one side of the glove box housing; and a wire 300 connecting the switch unit 100 and the lamp unit 200 to conduct electricity to each other. The glove box is configured such that the sliding rod 110 linearly moves and protrudes when the glove box door 400 is open, so as to supply power to the lamp 220.

In the glove box lighting device and the glove box according to one embodiment of the present disclosure, since the number of parts is reduced when assembling a vehicle, manufacturing costs can be reduced, and productivity can be improved.

BRIEF DESCRIPTION OF DRAWINGS

FIGS. 6 and 7 are perspective views showing some parts of the switch unit and a terminal of a wire according to one embodiment of the present disclosure, wherein FIG. 6 shows a state in which a connector is spaced apart from the terminal, and FIG. 7 shows a state in which the connector is in contact with the terminal.

DETAILED DESCRIPTION

Embodiments of the present disclosure are illustrated for the purpose of explaining the technical idea of the present disclosure. The scope of the rights according to the present disclosure is not limited to the embodiments presented below or the detailed descriptions of such embodiments.

All technical and scientific terms used in the present disclosure have meanings generally understood by those of ordinary skill in the art to which the present disclosure pertains, unless otherwise defined. All terms used in the present disclosure are chosen for the purpose of more clearly describing the present disclosure and are not chosen to limit the scope of rights according to the present disclosure.

As used in the present disclosure, expressions such as "comprising," "including," "having," and the like are to be understood as open-ended terms having the possibility of encompassing other embodiments, unless otherwise mentioned in the phrase or sentence containing such expressions.

The singular form described in the present disclosure may include a plural meaning, unless otherwise stated, and this applies equally to the singular form recited in the claims.

As used in the present disclosure, expressions such as "first" and "second" only distinguish a plurality of elements from one another and do not limit the order or importance of the corresponding elements.

In the present disclosure, where it is mentioned in the present disclosure that one element is "connected" to another element, it is to be understood that said one element may be directly connected to said another element, or may be connected to said another element via a new additional element.

Hereinafter, descriptions are made as to embodiments of the present disclosure with reference to the accompanying drawings. In the accompanying drawings, the same or corresponding elements are denoted by the same reference numerals.

Figure 1:
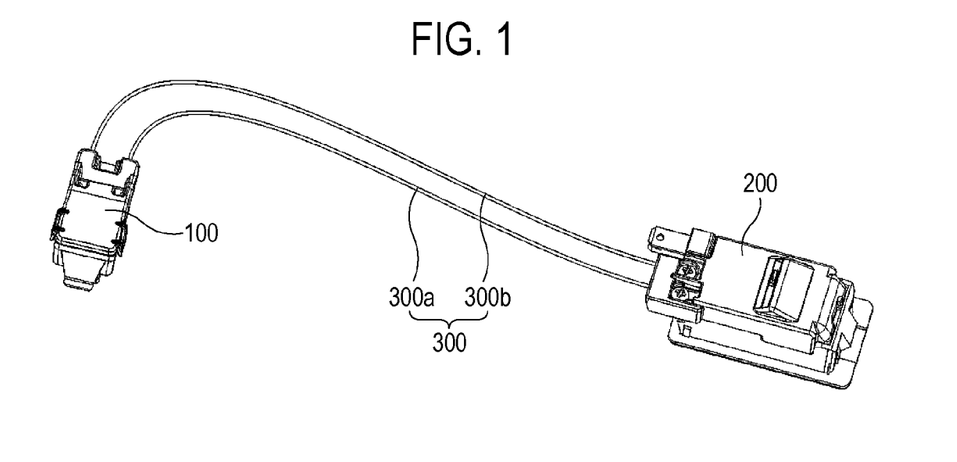
FIG. 1 is a perspective view of a glove box lighting device according to one embodiment of the present disclosure.
Figure 2:
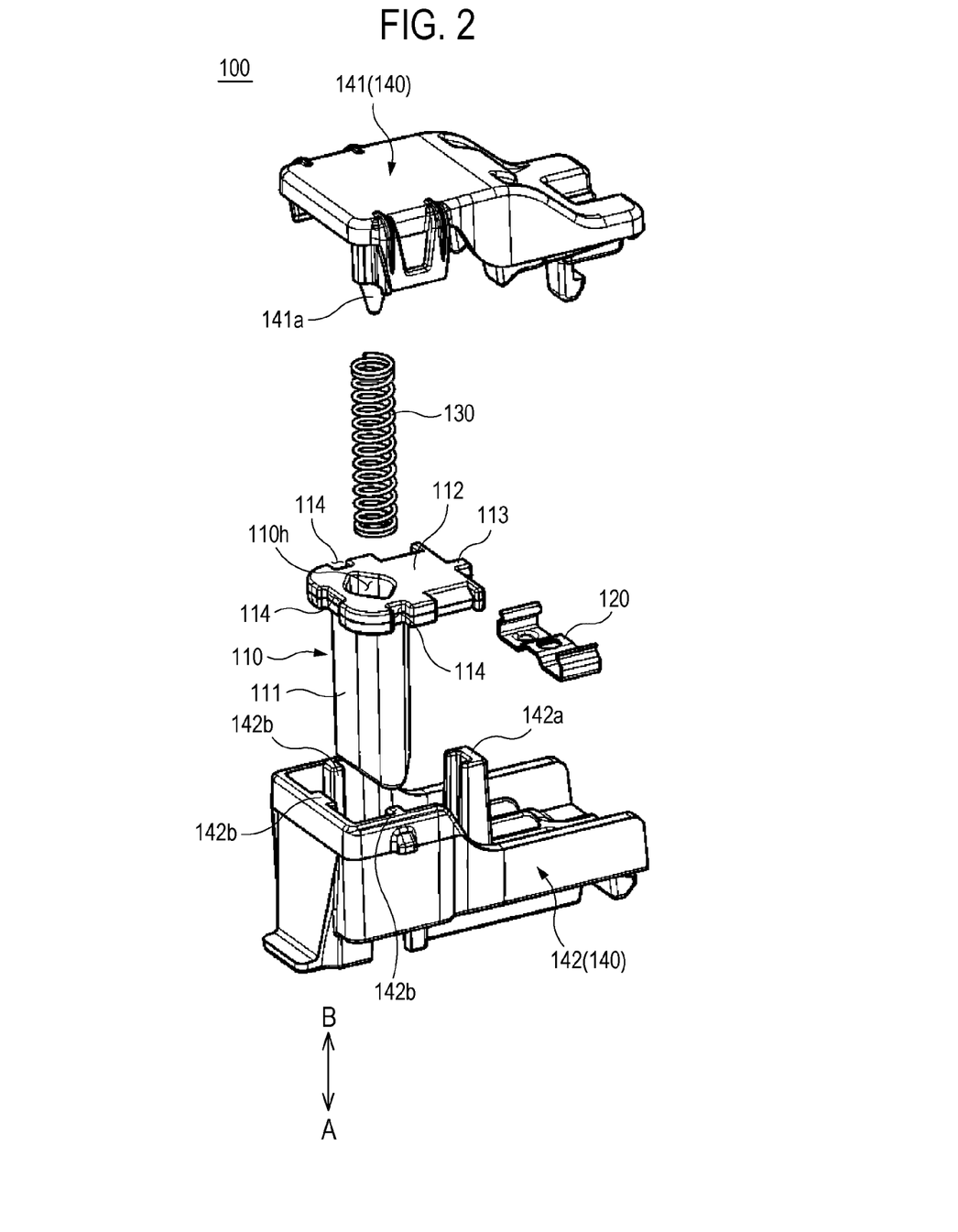
FIG. 2 is an exploded perspective view of a switch unit of FIG. 1.
Figure 3:
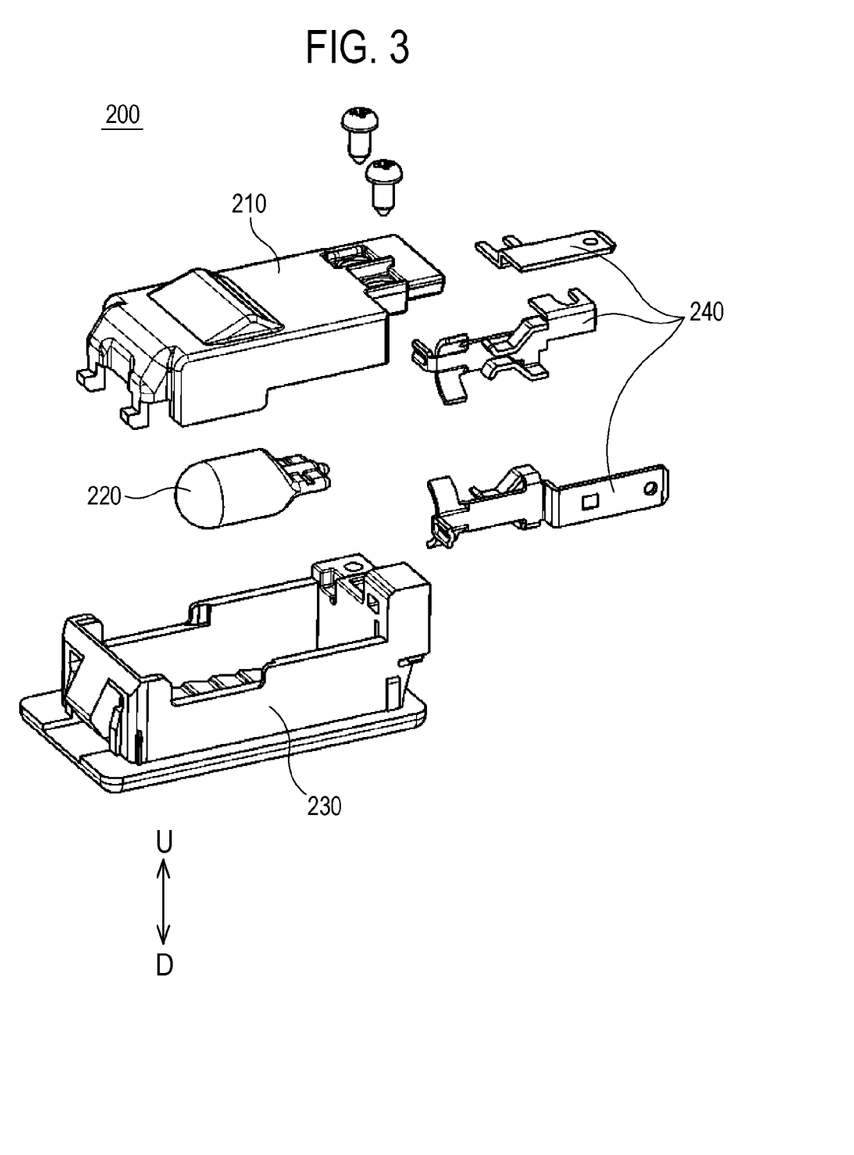
FIG. 3 is an exploded perspective view of a lamp unit of FIG. 1.
Figure 4:
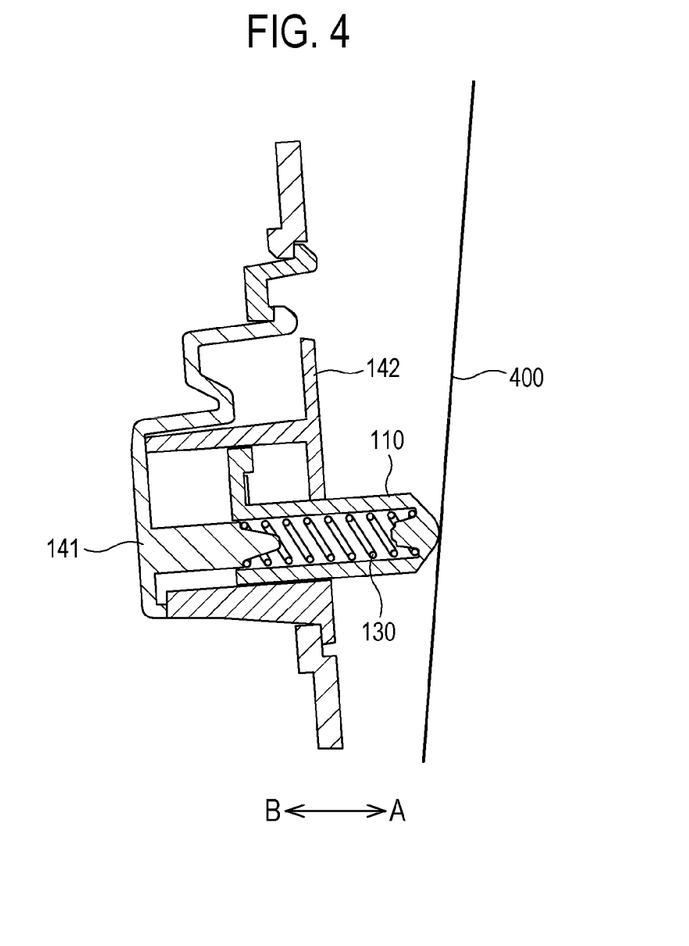
FIG. 4 is a schematic cross-sectional view of the switch unit of FIG. 1 and shows a state in which the switch unit is operated to turn on a lamp.
Figure 5:
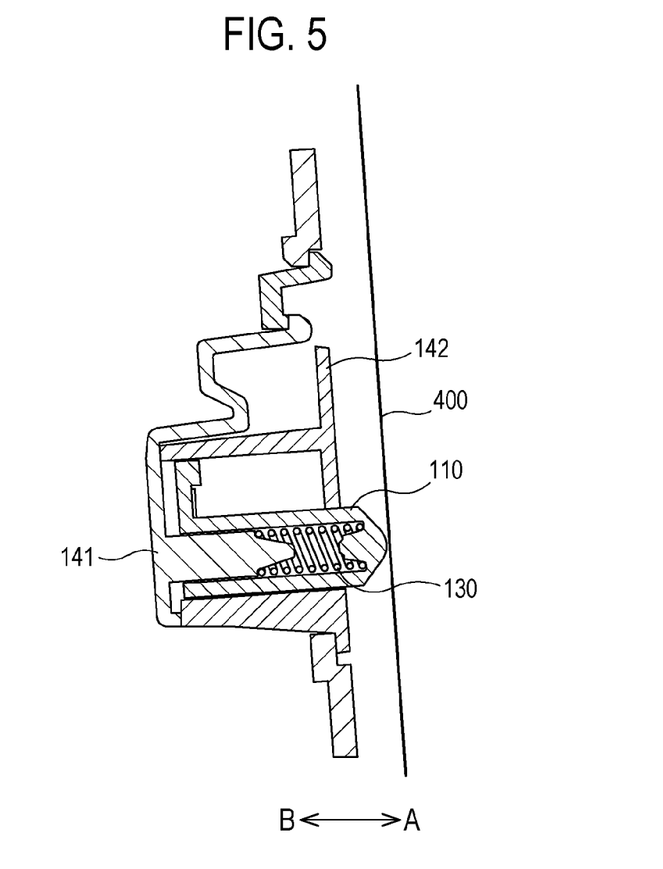
FIG. 5 is a schematic cross-sectional view of the switch unit of FIG. 1 and shows a state in which the switch unit is operated to turn off the lamp.
Figure 6:
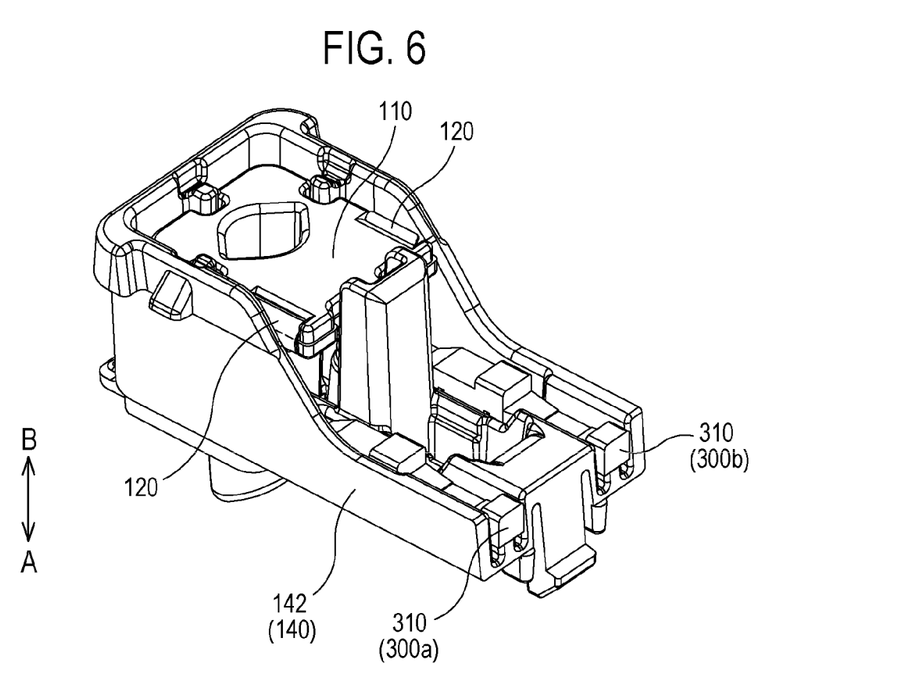
Figure 7:
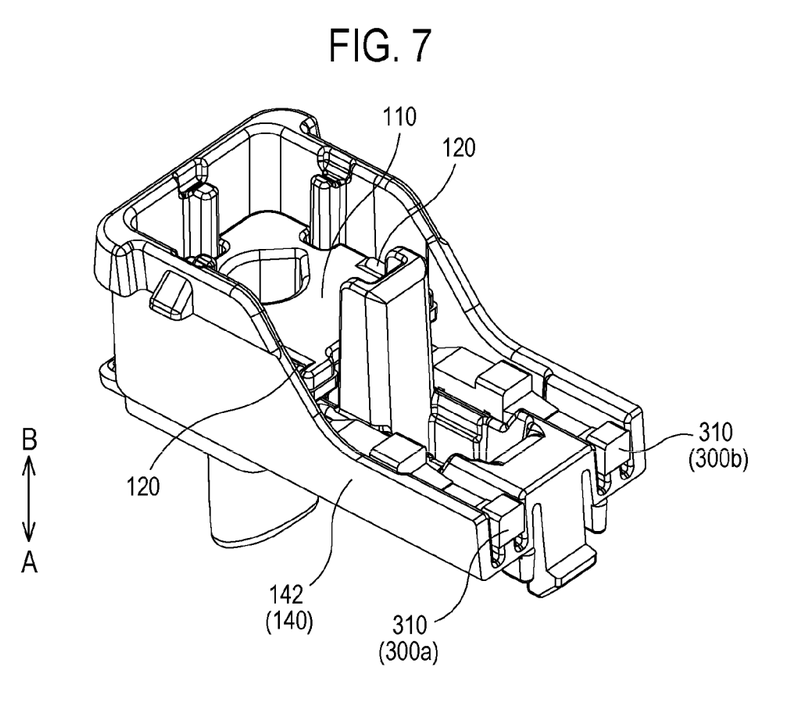
Figure 8:
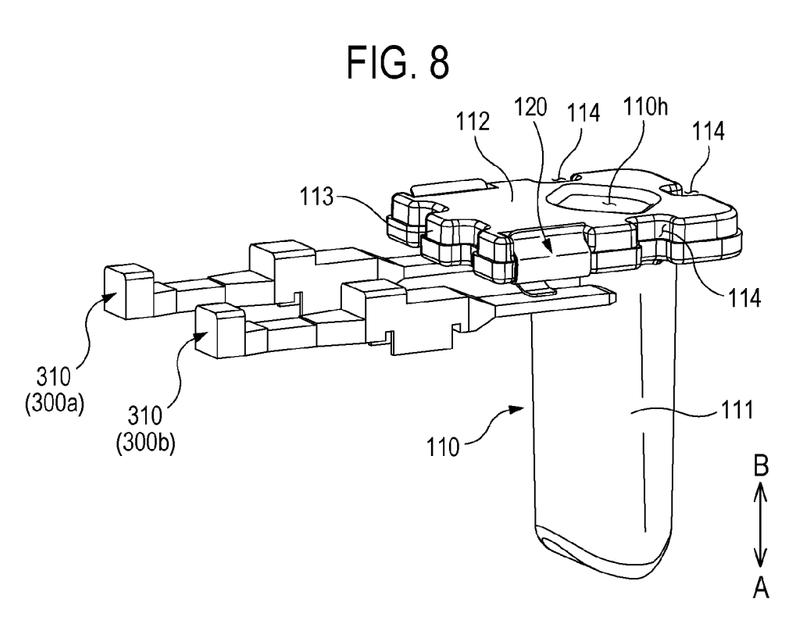
FIG. 8 is a perspective view showing a sliding rod, the connector, and the terminal of FIG. 7.
Figure 9:
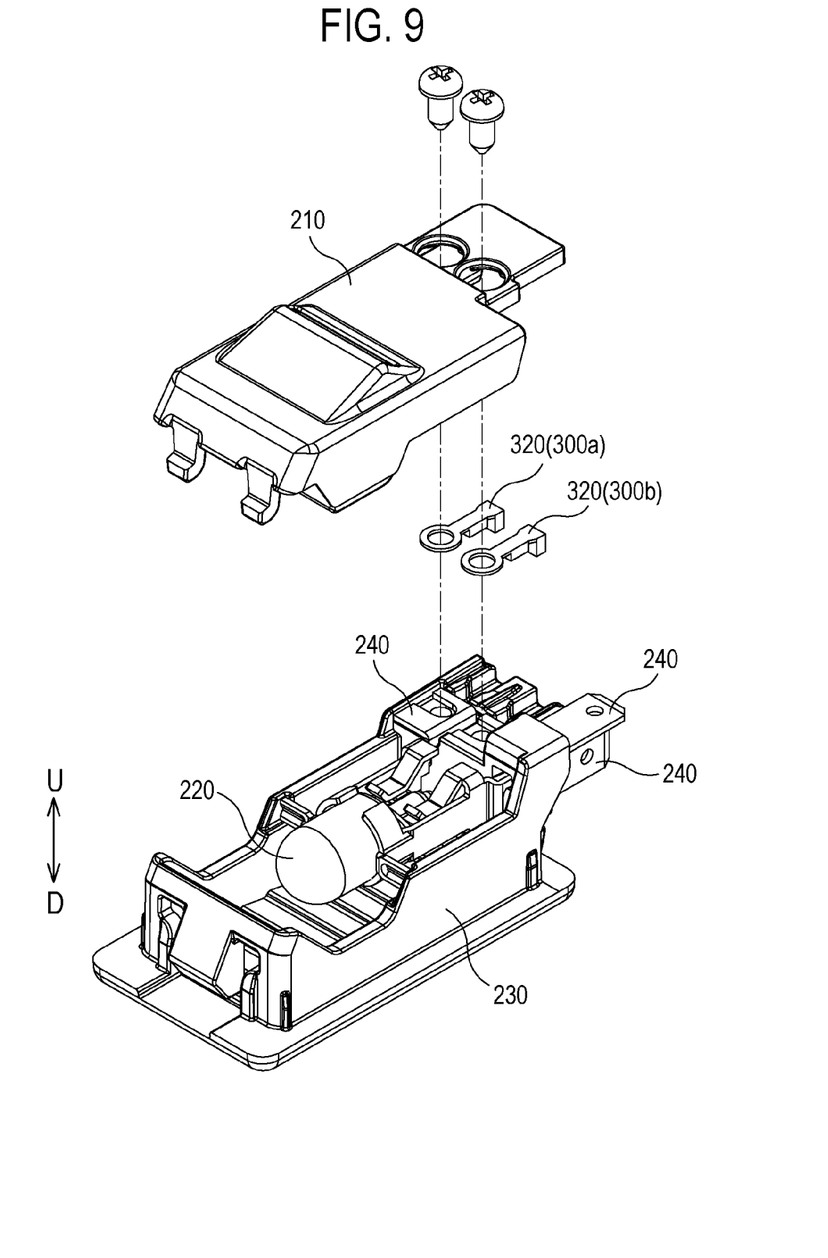
FIG. 9 is an exploded perspective view showing the lamp unit and a terminal of the wire according to one embodiment of the present disclosure.

FIG. 1 is a perspective view of a glove box lighting device according to one embodiment of the present disclosure. FIG. 2 is an exploded perspective view of a switch unit 100 of FIG. 1. FIG. 3 is an exploded perspective view of a lamp unit 200 of FIG. 1. FIG. 4 is a schematic cross-sectional view of the switch unit 100 of FIG. 1 and shows a state in which the switch unit 100 is operated to turn on a lamp 220. FIG. 5 is a schematic cross-sectional view of the switch unit 100 of FIG. 1 and shows a state in which the switch unit 100 is operated to turn off the lamp 220. FIGS. 6 and 7 are perspective views showing some parts of the switch unit 100 and a terminal 310 of a wire 300 according to one embodiment of the present disclosure, wherein FIG. 6 shows a state in which a connector 120 is spaced apart from the terminal 310, and FIG. 7 shows a state in which the connector 120 is in contact with the terminal 310. FIG. 8 is a perspective view showing a sliding rod 110, the connector 120, and the terminal 310 of FIG. 7. FIG. 9 is an exploded perspective view showing the lamp unit 200 and a terminal 320 of the wire 300 according to one embodiment of the present disclosure.

A glove box may be installed in a vehicle. The glove box may have a glove box housing (not illustrated) and a glove box door 400.

Referring to FIGS. 1 to 9, a glove box lighting device according to one embodiment of the present disclosure includes the switch unit 100. The switch unit 100 includes the sliding rod 110 configured to linearly move in accordance with opening/closing of the glove box door 400. The glove box lighting device includes the lamp unit 200 configured to be fixed at one side of the glove box housing. The lamp unit 200 includes the lamp 220 configured to be turned on when power is supplied thereto. The glove box lighting device includes the wire 300 connecting the switch unit 100 and the lamp unit 200 to conduct electricity to each other.

The switch unit 100 may be configured to be fixed to the glove box (not illustrated). The lamp unit 200 may be configured to be fixed to the glove box. The wire 300 may include a plurality of electric wires 300a and 300b. Each of the plurality of electric wires 300a and 300b may include the terminal 310 formed at one end and the terminal 320 formed at the other end.

The glove box lighting device may be configured such that the sliding rod 110 linearly moves and protrudes when the glove box door 400 is open, so as to supply power to the lamp 220. The glove box lighting device may be configured such that the sliding rod 110 is pressed by the glove box door 400 when the glove box door 400 is closed, so as to cut off power from the lamp 220.

The switch unit 100 may include an elastic body 130 configured to apply an elastic force to allow the sliding rod 110 to protrude. For example, the elastic body 130 may include a spring 130. The sliding rod 110 may move to protrude by the elastic force of the elastic body 130. The elastic body 130 may be configured to apply the elastic force to the sliding rod 110 in a contact direction A in which the sliding rod 110 comes in contact with the glove box door 400.

The switch unit 100 may include the connector 120 configured to come in contact with the terminal 310 of the wire 300 so that power is applied when the sliding rod 110 linearly moves and protrudes. Whether the connector 120 comes in contact with the terminal 310 may be changed according to a degree of protrusion of the sliding rod 110. In a state in which the connector 120 is in contact with the terminal 310 of the wire 300, power may be applied to a terminal 240 of the lamp unit 200.

The switch unit 100 may include a cover 140 on which the connector 120 and the sliding rod 110 are disposed. The cover 140 may include a first cover 141 and a second cover 142. The first cover 141 may be disposed in a direction B opposite to the contact direction A, and the second cover 142 may be disposed in the contact direction A. Herein, the contact direction A is defined as a direction in which the sliding rod 110 comes in contact with the glove box door 400.

The connector 120 may be fixed to the sliding rod 110. The connector 120 may move integrally with the sliding rod 110. The connector 120 may linearly move integrally with the sliding rod 110.

When the glove box door 400 is closed, the sliding rod 110 may move by being pressed by the glove box door 400 in the direction B opposite to the contact direction A. Herein, the connector 120 may move along with the sliding rod 110 and become spaced apart from the terminal 310 of the wire 300. Accordingly, power to the lamp 220 may be cut off. Herein, the elastic body 130 may be elastically deformed.

When the glove box door 400 is open, the sliding rod 110 may be released from being pressed by the glove box door 400 so that the sliding rod 110 moves in the contact direction A by an elastic force (elastic restoration force) of the elastic body 130. Herein, the connector 120 may move along with the sliding rod 110 and come in contact with the terminal 310 of the wire 300. Accordingly, power may be supplied to the lamp 220. Herein, the elastic body 130 may be elastically restored.

The sliding rod 110 may include a rod portion 111 that protrudes in the contact direction A to be capable of coming in contact with the glove box door 400. The rod portion 111 may be disposed to pass through the second cover 142.

The sliding rod 110 may include a support portion 112 that extends from the rod portion 111 in a direction crossing the contact direction A. The support portion 112 may be disposed to be slidable in the contact direction A and the opposite direction B inside the cover 140. The support portion 112 may be formed in the shape of a plate. The connector 120 may be disposed at a side surface of the support portion 112 that faces the contact direction A.

A groove 110h into which the elastic body 130 is inserted may be formed in the sliding rod 110. The groove 110h may be formed to be recessed in the contact direction A at a side surface, which faces in the opposite direction B, of the sliding rod 110. The groove 110h may extend in the contact direction A along the rod portion 111.

The sliding rod 110 may include sliding portions 113 and 114 that protrude or are recessed in a direction crossing the contact direction A. The sliding portions 113 and 114 may be formed at the support portion 112. The sliding portions 113 and 114 may include a sliding protrusion 113 that protrudes in the direction crossing the contact direction A. The sliding portions 113 and 114 may include a sliding groove 114 that is recessed in the direction crossing the contact direction A.

The cover 140 may include guide portions 142a and 142b configured to guide sliding of the sliding rod 110. The guide portions 142a and 142b may guide movement of the sliding rod 110 so that the sliding rod 110 moves in the contact direction A or the opposite direction B. The guide portions 142a and 142b may extend in the contact direction A. The guide portions 142a and 142b may be formed inside the cover 140. The guide portions 142a and 142b may be formed at the second cover 142. The guide portions 142a and 142b may include a guide portion 142a that forms a groove into which the sliding protrusion 113 is inserted. The guide portions 142a and 142b may include a guide portion 142b that forms a protrusion inserted into the sliding groove 114.

The first cover 141 may include a protruding portion 141a configured to support an end of the elastic body 130 in the opposite direction B. The protruding portion 141a may protrude in the contact direction A from an inner side surface of the first cover 141. A protruding end of the protruding portion 141a may be inserted into the groove 110h of the sliding rod 110.

The lamp unit 200 may include a lamp housing 210 configured to be fixed to the glove box housing. The lamp unit 200 may include a lens 230 fixed to a lower portion of the lamp housing 210. Light generated by the lamp 220 may pass through the lens 230. Herein, a downward direction D is defined as a direction in which the lamp 220 is disposed with respect to the lamp housing 210, and an upward direction U is defined as a direction opposite to the downward direction D.

The lamp unit 200 may include the terminal 240 connected to the wire 300. The terminal 240 may connect the lamp 220 and the wire 300 to allow power to be applied to the lamp 220. One side end portion of the terminal 240 may be connected to the lamp 220, and the other side end portion of the terminal 240 may be connected to the wire 300.

In a state in which the lamp unit 200 and the switch unit 100 are installed to be fixed to the glove box housing and the inside of the glove box, respectively, the connector 120 included in the switch unit 100 and the terminal 240 included in the lamp unit 200 may be connected to each other by the wire 300.

The sliding rod 110 may be installed between the first cover 141 and the second cover 142 to protrude in the contact direction A by the elastic force of the elastic body 130. When a passenger riding in the vehicle opens the glove box door 400, the sliding rod 110 may be drawn out of the cover 140 by the elastic force of the elastic body 130. Herein, in response to the sliding rod 110 being drawn out, the connector 120 may come in contact with the wire 300, and power may be transmitted to the terminal 240 of the lamp unit 200 through the wire 300 and supplied to the lamp 220. The lamp 220 to which power is supplied generates light, and the light generated by the lamp 220 is widely emitted through the lens 230 and illuminates the inside of the glove box.

Meanwhile, when the glove box door is closed, the sliding rod 110 may be drawn into the cover 140 while the elastic body 130 is compressed. Herein, in response to the sliding rod 110 being drawn in, the connector 120 may become spaced apart from the wire 300, and power transmitted to the lamp unit 200 through the wire 300 may be cut off. Accordingly, power supplied to the lamp 220 may be cut off, and the lamp 220 may be turned off.

Power is supplied to or cut off from the lamp 220 according to whether the sliding rod 110 is drawn in or out for the following reasons. Among terminals 240 installed to have one side end portion connected to the lamp 220 of the lamp unit 200, one terminal 240 may be installed to be connected to a negative (−) wire of a power supply, and another terminal 240 not connected to the negative (−) wire of the power supply may be installed to be connected to a positive (+) wire of the power supply. Any one of the negative (−) wire and the positive (+) wire may be an opening/closing wire whose open/closed state is changed by the connector 120. When the sliding rod 110 is drawn out of the cover 140, in response to the connector 120, which is installed at the sliding rod 110, coming in contact with the terminal 310 of the wire 300, the opening/closing wire can be closed and power can be applied. When the sliding rod 110 is drawn into the cover 140, in response to the connector 120, which is installed at the sliding rod 110, being separated from the terminal 310, the opening/closing wire can be opened and power can be cut off.

The technical idea of the present disclosure has been described heretofore with reference to some embodiments and examples shown in the accompanying drawings. However, it is to be understood that various substitutions, modifications and alterations may be made without departing from the technical idea and scope of the present disclosure that can be understood by those of ordinary skill in the technical field to which the present disclosure pertains. Further, it is to be understood that such substitutions, modifications and alterations fall within the scope of the appended claims.

What is claimed is:

1. A glove box lighting device installed in a glove box having a glove box housing and a glove box door (400), the glove box lighting device comprising:
   a switch unit (100) including a sliding rod (110) configured to linearly move in accordance with opening/closing of the glove box door (400);
   a lamp unit (200) including a lamp (220) configured to be turned on when power is supplied thereto and being configured to be fixed at one side of the glove box housing;
   a wire (300) connecting the switch unit (100) and the lamp unit (200) to conduct electricity to each other;
   an elastic body (130) configured to apply an elastic force to allow the sliding rod (110) to protrude; and
   a connector (120) fixed to the sliding rod (110) and configured to move together with the sliding rod (110) to come in contact with a terminal (310) of the wire (300) so that power to the lamp unit (200) is supplied or be spaced apart from the terminal (310) of the wire (300) so that power to the lamp unit (200) is cut off,
   wherein the glove box lighting device is configured such that the sliding rod (110) linearly moves and protrudes when the glove box door (400) is open, so as to supply power to the lamp (220).

2. The glove box lighting device of claim 1, wherein the switch unit (100) further includes:
   a cover (140) on which the connector (120) and the sliding rod (110) are disposed.

3. The glove box lighting device of claim 1, wherein the lamp unit (200) further includes a terminal (240) connected to the wire (300).

4. The glove box lighting device of claim 1, wherein the switch unit (100) is configured to be fixed to the glove box.

5. The glove box lighting device of claim 1, wherein the lamp unit (200) further includes:
   a lamp housing (210) configured to be fixed to the glove box housing;
   a lens (230) which is fixed to a lower portion of the lamp housing (210) and through which light generated by the lamp (220) passes; and
   a terminal (240) configured to connect the lamp (220) and the wire (300) to allow power to be applied to the lamp (220).

6. The glove box lighting device of claim 5, wherein one side end portion of the terminal (240) is connected to the lamp (220), and the other side end portion of the terminal (240) is connected to the wire (300).

7. The glove box lighting device of claim 1, wherein
   the elastic body (130) applies the elastic force to the sliding rod (110) in a contact direction (A) in which the sliding rod (110) comes in contact with the glove box door (400),
   wherein the glove box lighting device is configured such that, when the glove box door (400) is closed, the sliding rod (110) is pressed by the glove box door (400) to move in a direction (B) opposite to the contact direction (A) so that the connector (120) is spaced apart from the terminal (310) of the wire (300), and
   the glove box lighting device is configured such that, when the glove box door (400) is open, the sliding rod (110) is released from being pressed by the glove box door (400) so that the sliding rod (110) moves in the contact direction (A) by the elastic force and the connector (120) comes in contact with the terminal (310) of the wire (300).

8. A glove box comprising:
   a glove box housing;
   a glove box door (400) configured to open/close the glove box housing;
   a switch unit (100) including a sliding rod (110) configured to linearly move in accordance with opening/closing of the glove box door (400);
   a lamp unit (200) including a lamp (220) configured to be turned on when power is supplied thereto and being configured to be fixed at one side of the glove box housing;
   a wire (300) connecting the switch unit (100) and the lamp unit (200) to conduct electricity to each other;
   an elastic body (130) configured to apply an elastic force to allow the sliding rod (110) to protrude; and
   a connector (120) fixed to the sliding rod (110) and configured to move together with the sliding rod (110) to come in contact with a terminal (310) of the wire (300) so that power to the lamp unit (200) is supplied or be spaced apart from the terminal (310) of the wire (300) so that power to the lamp unit (200) is cut off,
   wherein the glove box is configured such that the sliding rod (110) linearly moves and protrudes when the glove box door (400) is open, so as to supply power to the lamp (220).

* * * * *